United States Patent

(12) United States Patent
Lin

(10) Patent No.: US 9,799,220 B2
(45) Date of Patent: Oct. 24, 2017

(54) KEYLESS ENTRY SYSTEM LINKED TO VEHICLE-TO-VEHICLE COMMUNICATIONS SYSTEM

(71) Applicant: TRW AUTOMOTIVE U.S. LLC, Livonia, MI (US)

(72) Inventor: Xing Ping Lin, Orchard Lake, MI (US)

(73) Assignee: TRW Automotive U.S. LLC, Livonia, MI (US)

(*) Notice: Subject to any disclaimer, the term of this patent is extended or adjusted under 35 U.S.C. 154(b) by 0 days.

(21) Appl. No.: 15/013,492

(22) Filed: Feb. 2, 2016

(65) Prior Publication Data

US 2016/0225260 A1 Aug. 4, 2016

Related U.S. Application Data

(60) Provisional application No. 62/111,740, filed on Feb. 4, 2015.

(51) Int. Cl.
 G08G 1/00 (2006.01)
 G08G 1/0967 (2006.01)
 B60R 25/24 (2013.01)

(52) U.S. Cl.
 CPC ....... *G08G 1/096791* (2013.01); *B60R 25/24* (2013.01)

(58) Field of Classification Search
 CPC .......... F41H 1/02; H04N 7/183; G08B 25/016
 See application file for complete search history.

(56) References Cited

U.S. PATENT DOCUMENTS

| 5,973,611 A | 10/1999 | Kulha et al. |
|---|---|---|
| 2003/0231550 A1 | 12/2003 | Macfarlane |
| 2007/0001805 A1 | 1/2007 | Utter et al. |
| 2008/0055116 A1 | 3/2008 | Luo et al. |
| 2011/0098877 A1* | 4/2011 | Stahlin .................. G08G 1/161 701/31.4 |
| 2011/0227759 A1* | 9/2011 | Aunkofer .............. G08G 1/161 340/905 |
| 2012/0065858 A1 | 3/2012 | Nickolaou et al. |
| 2013/0158862 A1 | 6/2013 | Stahlin et al. |
| 2014/0044212 A1* | 2/2014 | Menzel ................ H04B 5/0043 375/285 |
| 2014/0139331 A1 | 5/2014 | Oliver |
| 2015/0237141 A1* | 8/2015 | Stahlin .................. H04L 67/12 370/338 |
| 2015/0310744 A1* | 10/2015 | Farrelly ........... G06Q 10/06311 340/932.2 |

FOREIGN PATENT DOCUMENTS

CA  2639353  5/2010

OTHER PUBLICATIONS

PCT/US216/16275 International Search Report and Written Opinion, dated Mar. 29, 2016.

* cited by examiner

*Primary Examiner* — Erin File
(74) *Attorney, Agent, or Firm* — Tarolli, Sundheim, Covell & Tummino LLP

(57) ABSTRACT

Apparatus for use in a vehicle equipped with a vehicle-to-vehicle communication system. A remote keyless entry fob is provided for remote control of vehicle access. The fob includes a receiver for receiving a message broadcast by the vehicle-to-vehicle communication system and a memory for storing at least some elements of the message.

25 Claims, 1 Drawing Sheet

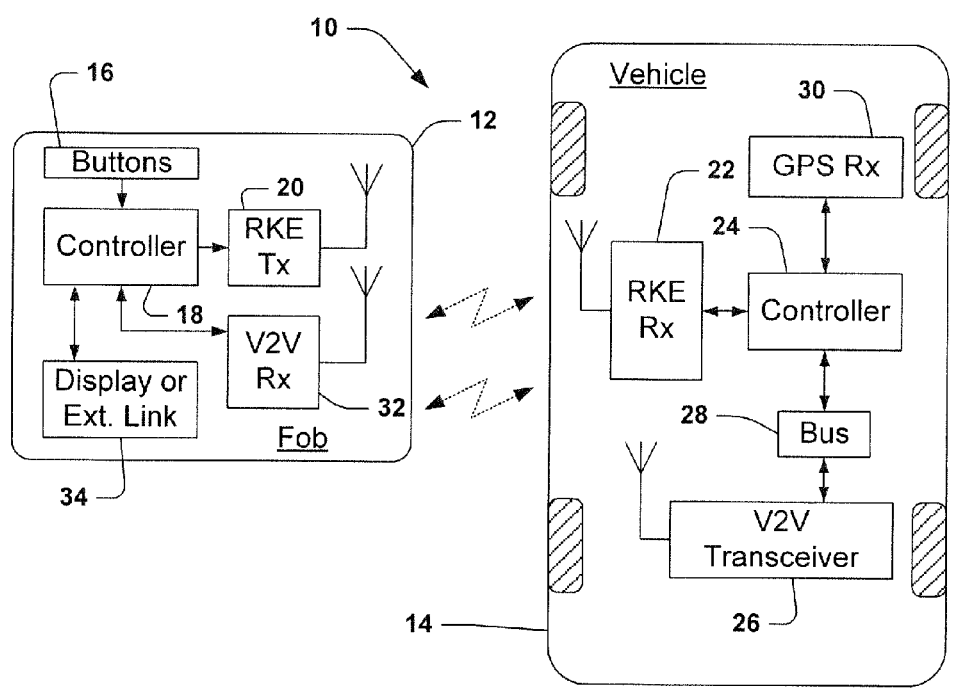

KEYLESS ENTRY SYSTEM LINKED TO VEHICLE-TO-VEHICLE COMMUNICATIONS SYSTEM

FIELD OF THE INVENTION

The present invention is directed to a remote keyless entry system for a vehicle, where the remote keyless entry system is linked to and cooperative with a vehicle-to-vehicle communications system.

BACKGROUND

Remote keyless entry ("RKE") systems are widely used in vehicle entry applications. A small, portable, battery-powered fob controls entry into the vehicle wirelessly via one or more radio frequency ("RF") links. RKE systems may be designed for one-directional RF communication (from a fob to a vehicle), only, or for bidirectional communication between the fob and the vehicle. In one-way RKE systems, the fob contains an RF transmitter for sending entry commands to an RF receiver mounted inside the vehicle. In two-way RKE systems, the fob is instead equipped with an RF transceiver for two-directional communication with another transceiver mounted inside the vehicle.

The U.S. Department of Transportation's ("DOT's") National Highway Traffic Safety Administration ("NHTSA") announced in February, 2014 that it was beginning to take steps to enable light vehicles in the U.S. to be equipped with vehicle-to-vehicle ("V2V") communication. The V2V communication technology would allow vehicles to "talk" to each other, exchanging basic safety data, such as speed and position, ten times every second. The goal of the V2V technology would be to avoid many crashes altogether through the sharing of situational information. NHTSA also stated in the announcement that they would begin working on a regulatory proposal that would require V2V devices in new vehicles in a future year. It is expected that such V2V communication systems will operate in the 5.8 GHz range.

SUMMARY OF THE INVENTION

In accordance with the present invention, a vehicle's RKE system is linked to and cooperative with the vehicle's V2V communication system. Advantageously, the RKE system is designed to operate within the same frequency band (e.g., the 5.8 GHz band) used for V2V communications.

In accordance with one example embodiment of the present invention, apparatus is provided for use in a vehicle equipped with a vehicle-to-vehicle communication system. The apparatus comprises a remote keyless entry fob for remote control of vehicle access where the fob includes a receiver for receiving a message generated by the vehicle-to-vehicle communication system and a memory for storing at least some elements of the message.

According to one aspect, a vehicle safety system can include a vehicle-based vehicle-to-vehicle (V2V) system adapted to transmit and receive wireless V2V communication signals. The vehicle safety system can also include a vehicle-based remote keyless entry (RKE) system adapted to transmit and/or receive wireless RKE signals. The vehicle safety system can further include a fob adapted to transmit wireless RKE signals to the vehicle-based RKE system and/or receive wireless RKE signals from the vehicle-based RKE system. The fob can also be adapted to receive wireless signals from the vehicle-based V2V communication system.

According to another aspect, alone or in combination with any other aspect, the fob can include at least one of an RKE transmitter, an RKE receiver, and an RKE transceiver for communicating with the vehicle-based RKE system. The fob can also include at least one of a V2V transmitter, a V2V receiver, and a V2V transceiver for communicating with the vehicle-based V2V communication system.

According to another aspect, alone or in combination with any other aspect, the vehicle-based V2V communication system can include at least one of a V2V transmitter, a V2V receiver, and a V2V transceiver for communicating with V2V communication systems of other vehicles within a predetermined vicinity of the V2V communication system.

According to another aspect, alone or in combination with any other aspect, the fob can include at least one of a transmitter, a receiver, and a transceiver adapted to communicate with both the vehicle-based V2V communication system and the vehicle-based RKE system.

According to another aspect, alone or in combination with any other aspect, the vehicle-based V2V communication system and the vehicle-based RKE system can be adapted to communicate with the fob via a shared communication frequency. The shared communication frequency can be a frequency within or near the high frequency radio frequency spectrum. The shared communication frequency is a 5.8 GHz frequency.

According to another aspect, alone or in combination with any other aspect, the vehicle-based V2V communication system can collect information including at least one of GPS information related to the location of the vehicle and vehicle condition information related to the condition of the vehicle.

According to another aspect, alone or in combination with any other aspect, the vehicle-based V2V communication system can be adapted to broadcast the wireless V2V communication signals to vehicles within a predetermined vicinity.

According to another aspect, alone or in combination with any other aspect, the vehicle-based V2V communication system can be further adapted to receive V2V communication signals from other vehicles within a predetermined vicinity and provide the recorded messages to onboard vehicle systems and subsystems for display or responsive action.

According to another aspect, alone or in combination with any other aspect, the vehicle-based V2V communication system can be adapted to operate while the vehicle is operating. The V2V communication system can also be adapted to notify nearby vehicles of safety data comprising at least one of velocity, direction, location, linear acceleration, and rotational acceleration.

According to another aspect, alone or in combination with any other aspect, the vehicle-based V2V communication system can be adapted to remain powered and active for a predetermined period of time after the vehicle ignition is switched off in order to broadcast one or more final V2V communication signals.

According to another aspect, alone or in combination with any other aspect, the final V2V communication signals can include at least one of vehicle stationary status information, location information, and vehicle safety information.

According to another aspect, alone or in combination with any other aspect, the fob can be adapted to store at least a portion of the information received in the final V2V communication signals in memory.

According to another aspect, alone or in combination with any other aspect, the fob can be adapted to receive and store only the information in the one or more final V2V communication signals.

According to another aspect, alone or in combination with any other aspect, the fob can be adapted to receive and verify a vehicle ID portion of the V2V communication signal to verify that the signal is from the vehicle associated with the fob.

According to another aspect, alone or in combination with any other aspect, the fob can be adapted to ignore V2V communication signals from other vehicles based on the vehicle ID portion.

According to another aspect, alone or in combination with any other aspect, the fob can be adapted to store the information received in the V2V communication signal in the memory within the fob.

According to another aspect, alone or in combination with any other aspect, the fob can be adapted to permit a user to access the vehicle location information and other V2V communications signal elements including information regarding vehicle malfunctions associated with vehicle safety.

According to another aspect, alone or in combination with any other aspect, the fob can be adapted to provide selected elements of the V2V communication signal to the owner via an indicator including at least one of a display on the fob, a cell phone, a tablet computer, a personal or notebook computer, a television via at least one of a near field communication link, a low-power RF communication protocol, and a USB connection.

According to another aspect, alone or in combination with any other aspect, the fob can be adapted to utilize GPS location information from the V2V communication signal stored on the fob to determine the location of the vehicle relative to the fob.

According to another aspect, alone or in combination with any other aspect, the fob can include an embedded GPS receiver and is adapted to compare current GPS location of the fob with stored GPS location of the vehicle to determine the location of the vehicle relative to the fob.

According to another aspect, alone or in combination with any other aspect, the fob can be adapted to cooperate with an external device having GPS capabilities to determine the location of the vehicle relative to the fob.

According to another aspect, alone or in combination with any other aspect, the fob and the V2V communication system can be adapted to communicate on the same frequency, the fob being adapted to obtain safety information and location information from the V2V communication system and provide the safety and location information to an external system for at least one of vehicle diagnosis, vehicle locating, and vehicle information recordation and/or display.

According to another aspect, alone or in combination with any other aspect, the fob can be adapted to periodically ping the V2V communication system for information related to vehicle security systems, comprising glass breakage information, door lock information, vehicle ignition information, vehicle impact information, and vehicle security system information. According to another aspect, alone or in combination with any preceding aspect,

BRIEF DESCRIPTION OF THE DRAWINGS

The foregoing and other features and advantages of the present invention will become apparent to those skilled in the art to which the present invention relates upon reading the following description with reference to the accompanying drawing, in which:

FIG. 1 is a simplified block diagram of one example embodiment of the present invention.

DETAILED DESCRIPTION

In one example embodiment of the present invention, a vehicle is equipped with a vehicle to vehicle ("V2V") communication system operating in a particular RF band, such as the 5.8 GHz band, and is also equipped with a remote keyless entry ("RKE") system that is configured to receive communications from the V2V communication system.

Referring to FIG. 1, a vehicle RKE system 10 typically includes a portable fob 12, carried by the vehicle owner, which is capable of transmitting RF messages to a paired vehicle 14. The fob may include, for example, operator buttons 16, a controller 18, and an RKE RF transmitter 20. RKE transmitter 20 will send RKE messages in RF channels of 315 MHz or 434 MHz, for example. Such RKE systems have been in use for many years and are now sophisticated communications systems, often bidirectional, employing low frequency ("LF") initiation and using rolling code encryption processes for enhanced security. For simplicity, such features are omitted from FIG. 1.

Vehicle 14 will include an RF RKE receiver 22 for receiving RKE messages from the fob, as well as a controller 24 for responding to such messages by, e.g., locking or unlocking vehicle doors, opening the boot or trunk or rear gate, sounding the horn, etc. The fob and vehicle RKE systems may even cooperate to provide hands-free door unlocking, vehicle keyless start, and other benefits.

In FIG. 1, vehicle 14 is equipped with a V2V communication system including a V2V transceiver 26. Transceiver 26 communicates with controller 24 and other vehicle systems via a bus 28. V2V transceiver 26 collects location information from a GPS receiver 30, as well as other vehicle information from other vehicle subsystems, and assembles the information into one or more V2V messages. Transceiver 26 broadcasts the messages to nearby vehicles in the RF channel allocated to V2V communications, for example 5.8 GHz. Of course, V2V transceiver 26 will also receive V2V messages from nearby vehicles and send such messages to other onboard vehicle subsystems for display or other appropriate responsive actions.

In accordance with one example embodiment of the present invention, RKE fob 12 will also be equipped with a V2V RF receiver 32 to receive messages generated by the vehicle's V2V communication system. As stated previously, such messages will be broadcast in a much higher frequency channel, such as 5.8 GHz, than is typically used by RKE systems. To receive this V2V signal, the receiver 32 will be dedicated receiver, optimized for the V2V channel. In bidirectional RKE systems, however, receiver 32 may be a digitally-tuned receiver capable of being electronically tuned to receive signals in either the V2V or the RKE channel. Of course, the fob and the RKE system overall could otherwise be configured to incorporate any or all of the various benefits and advancements of existing RKE systems.

The vehicle's V2V communication system, which is shown only in simplified form in FIG. 1, could take any conventional form. As previously stated, V2V transceiver 26 will receive and send V2V messages in the assigned V2V RF frequency band. The V2V communication system will operate while the vehicle is in operation, notifying nearby vehicles of basic safety data, such as speed and position, multiple times per second. The position information will be obtained from a GPS receiver on the vehicle. The GPS receiver may be embedded in the V2V communication system or, as illustrated in the FIG. 1 embodiment, it may instead be embedded in some other vehicular system and sent to the V2V communication system over the vehicle data bus 28. In addition to speed and location, the message broadcast by the V2V communication system may include other information about that vehicle, e.g. status information such as linear and rotational acceleration that is relevant to the safety of surrounding vehicles.

When a driver turns off the ignition switch of the vehicle, the V2V communication system will remain powered and active for a short period of time to broadcast one or more final V2V messages notifying nearby vehicles of the vehicle's stationary status and its location. The V2V message will preferably include not only vehicle location and status, but also other safety information.

The owner's fob 12 receives the V2V information via its embedded V2V receiver 32, and stores some or all of the information in a memory in the fob. In FIG. 1, the memory is contained within controller 18. V2V information is loaded into memory, and later retrieved from memory, by the programmed microprocessor that forms the core of controller 18. To prevent excess fob battery usage, the controller is programmed to receive and store only the information in such "final" V2V messages, and not the routine V2V messages that are broadcast during travel. Such "final" V2V messages are preferably identified via a tag embedded in the messages, but could instead be deduced readily from velocity or location information within the message. Moreover, fob 12 monitors and verifies the vehicle ID portion of the V2V message and will not listen to or record information from messages sent by vehicles other than the vehicle with which the fob is paired.

The V2V information will thereafter be stored in the memory within the fob and will be carried about by the vehicle owner. Thus, the vehicle location information and other V2V message elements (including information regarding vehicle malfunctions associated with vehicle safety) are available to the owner via the fob. Selected elements of the information may be supplied to the owner via an indicator system 34. Indicator 34 may be a display device on the face of the fob. In this case, controller 18 will display information on the display device, either in a standard preset format or interactively responsive to button presses by the owner. Alternatively, for convenient readout of, and interaction with, the stored information, indicator 34 may be a link to other devices, e.g. the owner's cell phone, tablet, computer, or TV, via a near field communication ("NFC") link, a Bluetooth link, a USB port, or some other link. Through this arrangement, the owner can check the condition of the vehicle and especially information associated with vehicle safety. Armed with the V2V information, the owner can take proper action to resolve any issues related to vehicle safety.

Further, the vehicle's location, derived from the vehicle's GPS, will be present in the V2V information stored in the fob. The fob-stored vehicle location information can help the owner locate his or her vehicle. If the fob-stored vehicle location information is communicated to, and displayed on, a cell phone, tablet, or other device having its own embedded GPS receiver and a display screen, then the cell phone or other device will know the current location of the owner and can conveniently present on the display screen a conventional GPS map showing the owner's current location and also (from the V2V information stored in the fob) the location of the vehicle.

Alternatively, if the owner's fob also has its own embedded GPS receiver (not separately shown in FIG. 1), the fob may indicate the location of the vehicle relative to the fob either through a display screen on the fob, or via some other indicator. The indicator may be as rudimentary as an indicator light whose brightness, blink rate, or color changes to indicate whether the owner's current walking direction is bringing him or her nearer to the vehicle.

The fob may, e.g., calculate fob movement (equal to the change over time of the fob location) from local GPS data and compare that fob movement to the closing distance with the vehicle (equal to the change over time of the distance between the stored vehicle location and the current fob location). If the fob movement is roughly the same as the closing distance, then the driver is moving directly towards the vehicle. If the fob movement is the opposite of the closing distance, then the driver is moving directly away from the vehicle. The indicator light may be modulated as to color, intensity, blink rate, to indicate the two extremes (directly toward and directly away) and situations between the two extremes.

Thus, by operating on the same frequency channel as the V2V communication system, the fob can obtain safety information and location information from the V2V communication system and use the information for diagnosis, vehicle locating and other conveniences.

Moreover, subject to government regulatory approval, the system could be further simplified by eliminating the traditional RKE RF channel and instead sharing the V2V channel for both RKE and V2V communications. In such a system, the fob would send RKE messages in the V2V channel and the need for a separate RKE transceiver in the vehicle and in the fob would thus be obviated. Moreover, the fob transmitter, which would operate at V2V frequencies, could re-broadcast V2V information received from its paired vehicle and/or from other vehicles thereby to extend the range of the V2V information. The V2V information rebroadcast by the fob would be available to those vehicles that are within range of the RKE fob but not in range of the vehicle that generated the original V2V message. Rebroadcasting of the V2V message will thus expand the V2V operating range. The expanded range could be especially useful in situations where an accident has occurred.

In one embodiment of the present invention, the fob may be configured to periodically ping the vehicle to verify the continued presence of the vehicle. The fob may for example use the fob's RKE transmitter to ping the vehicle. Based on vehicle location (from stored V2V data) and the fob location, the fob may adjust its own transmission power level and even potentially specify to the vehicle the power level to be used for transmission of the V2V messages. As stated previously, fob location can be obtained through a GPS receiver inside the fob. Alternatively the GPS information could be supplied from a device external to the fob. The external device may, for example, have its own GPS receiver or it may know its location via some other means (e.g. an internet-connected desktop computer having an IP address associated with its location). Based on the distance between the fob and the vehicle (whose location is indicated by the V2V information stored in the fob) and the strength of the V2V reply from the vehicle, different warning information can be provided. For example, if the distance is short and yet no V2V reply is received following the ping, a high level warning will be issued.

The fob may also periodically monitor for V2V transmissions from its vehicle. If a bad event occurs (such as a thief breaking a window, unlocking a vehicle door, or starting the vehicle, or the parked vehicle being sharply jolted, as by another vehicle striking the parked vehicle), the vehicle will detect the event and will respond by triggering the V2V communication system to transmit V2V information to alert the vehicle owner's fob, and thus the owner, of the bad event. The V2V communication system may transmit at a higher power level initially to increase the chance that the fob will receive the signal.

A fob containing a V2V receiver may not only monitor V2V transmissions from its own vehicle, but also from other vehicles in the vicinity. Such other vehicles might be in the same parking lot or perhaps in proximity to the owner's property. In this case, the fob can act as a security surveillance tool. The fob may be placed on a charger in the house and constantly monitor V2V messages transmitted by vehicles in the area. The fob can be linked by a hard wire or a wireless link to a computer or home security system or electronic light system. For security or convenience, the computer or home security system can control house lights, including porch and/or garage lights, in response to alerts received by the fob. Also, or alternatively, the vehicle owner's garage door opener may be equipped with a V2V receiving channel to directly link to the fob and the vehicle.

Additionally, the fob can exclude a separate V2V receiver (e.g., to save cost) and can instead can include a fob-based RF transceiver matched to a vehicle-based RF transceiver. In this instance, both the fob transceiver and vehicle transceiver can serve the dual purposes of facilitating both V2V and RKE communications. For example, the vehicle and fob transceivers could communicate via high frequencies, such as 315 MHz or 434 MHz, or low frequency, such as 125 KHz. In operation, the vehicle-based transceiver can obtain vehicle information from the vehicle control module (e.g., body control module (BCM) via the vehicle data (CAN) bus), such as GPS location and vehicle condition data, and send that information to the fob just after ignition is turned off. The information can therefore be carried with the fob and can be accessed by the user for the various purposes described herein above, such as locating the vehicle, vehicle maintenance, vehicle security, etc.

From the above description of the invention, those skilled in the art will perceive improvements, changes and modifications. Such improvements, changes and modifications within the skill of the art are intended to be covered by the appended claims.

I claim:

1. A vehicle safety system comprising:
   a vehicle-based vehicle-to-vehicle (V2V) system adapted to transmit and receive wireless V2V communication signals;
   a vehicle-based remote keyless entry (RKE) system adapted to transmit and/or receive wireless RKE signals; and
   a fob adapted to transmit wireless RKE signals to the vehicle-based RKE system and/or receive wireless RKE signals from the vehicle-based RKE system, wherein the fob is further adapted to receive the wireless V2V communication signals transmitted from the vehicle-based V2V communication system.

2. The vehicle safety system recited in claim 1, wherein the fob comprises:
   at least one of an RKE transmitter, an RKE receiver, and an RKE transceiver for communicating with the vehicle-based RKE system; and
   at least one of a V2V transmitter, a V2V receiver, and a V2V transceiver for communicating with the vehicle-based V2V communication system.

3. The vehicle safety system recited in claim 1, wherein the vehicle-based V2V communication system comprises at least one of a V2V transmitter, a V2V receiver, and a V2V transceiver for communicating with V2V communication systems of other vehicles within a predetermined vicinity of the V2V communication system.

4. The vehicle safety system recited in claim 1, wherein the fob comprises at least one of a transmitter, a receiver, and a transceiver adapted to communicate with both the vehicle-based V2V communication system and the vehicle-based RKE system.

5. The vehicle safety system recited in claim 1, wherein the vehicle-based V2V communication system and the vehicle-based RKE system are adapted to communicate with the fob via a shared communication frequency.

6. The vehicle safety system recited in claim 5, wherein the shared communication frequency is a frequency within or above the high frequency radio frequency spectrum.

7. The vehicle safety system recited in claim 5, wherein the shared communication frequency is a 5.8 GHz frequency.

8. The vehicle safety system recited in claim 1, wherein the vehicle-based V2V communication system collects information comprising at least one of GPS information related to the location of the vehicle and vehicle condition information related to the condition of the vehicle.

9. The vehicle safety system recited in claim 1, wherein the vehicle-based V2V communication system is adapted to broadcast the wireless V2V communication signals to vehicles within a predetermined vicinity.

10. The vehicle safety system recited in claim 1, wherein the vehicle-based V2V communication system is further adapted to receive V2V communication signals from other vehicles within a predetermined vicinity and provide the recorded messages to onboard vehicle systems and subsystems for display or responsive action.

11. The vehicle safety system recited in claim 1, wherein the vehicle-based V2V communication system is adapted to operate while the vehicle is operating, the V2V communication system being adapted to notify nearby vehicles of safety data comprising at least one of velocity, direction, location, linear acceleration, and rotational acceleration.

12. The vehicle safety system recited in claim 1, wherein the vehicle-based V2V communication system is adapted to remain powered and active for a predetermined period of time after the vehicle ignition is switched off in order to broadcast one or more final V2V communication signals.

13. The vehicle safety system recited in claim 12, wherein the final V2V communication signals comprise at least one of vehicle stationary status information, location information, and vehicle safety information.

14. The vehicle safety system recited in claim 1, wherein the fob is adapted to store at least a portion of the information received in final V2V communication signals in memory.

15. The vehicle safety system recited in claim 14, wherein the fob is adapted to receive and store only the information in the final V2V communication signals.

16. The vehicle safety system recited in claim 1, wherein the fob is adapted to receive and verify a vehicle ID portion of the V2V communication signal to verify that the signal is from the vehicle associated with the fob.

17. The vehicle safety system recited in claim 16, wherein the fob is adapted to ignore V2V communication signals from other vehicles based on a vehicle ID portion.

18. The vehicle safety system recited in claim 1, wherein the fob is adapted to store the information received in the V2V communication signal in the memory within the fob.

19. The vehicle safety system recited in claim 1, wherein the fob is adapted to permit a user to access the vehicle location information and other V2V communications signal elements including information regarding vehicle malfunctions associated with vehicle safety.

20. The vehicle safety system recited in claim 1, wherein the fob is adapted to provide selected elements of the V2V communication signal to the owner via an indicator comprising at least one of a display on the fob, a cell phone, a tablet computer, a personal or notebook computer, a television via at least one of a near field communication link, a low-power RF communication protocol, and a USB connection.

21. The vehicle safety system recited in claim 1, wherein the fob is adapted to utilize GPS location information from the V2V communication signal stored on the fob to determine the location of the vehicle relative to the fob.

22. The vehicle safety system recited in claim 1, wherein the fob comprises an embedded GPS receiver and is adapted to compare current GPS location of the fob with stored GPS location of the vehicle to determine the location of the vehicle relative to the fob.

23. The vehicle safety system recited in claim 1, wherein the fob is adapted to cooperate with an external device having GPS capabilities to determine the location of the vehicle relative to the fob.

24. The vehicle safety system recited in claim 1, wherein the fob and the V2V communication system are adapted to communicate on the same frequency, the fob being adapted to obtain safety information and location information from the V2V communication system and provide the safety and location information to an external system for at least one of vehicle diagnosis, vehicle locating, and vehicle information recordation and/or display.

25. The vehicle safety system recited in claim 1, wherein the fob is adapted to periodically ping the V2V communication system for information related to vehicle security systems, comprising glass breakage information, door lock information, vehicle ignition information, vehicle impact information, and vehicle security system information.

* * * * *